US008532294B1

(12) United States Patent
Michener et al.

(10) Patent No.: US 8,532,294 B1
(45) Date of Patent: *Sep. 10, 2013

(54) JUST IN TIME DELIVERY OF ENTITLEMENT CONTROL MESSAGES (ECMS) AND OTHER ESSENTIAL DATA ELEMENTS FOR TELEVISION PROGRAMMING

(75) Inventors: James A. Michener, Grass Valley, CA (US); Hanno Basse, Santa Monica, CA (US); Raynold M. Kahn, Los Angeles, CA (US); Peter M. Klauss, Torrance, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 191 days.

This patent is subject to a terminal disclaimer.

(21) Appl. No.: 13/053,100

(22) Filed: Mar. 21, 2011

Related U.S. Application Data (63) Continuation of application No. 11/202,977, filed on Aug. 12, 2005, now Pat. No. 7,912,219.

(51) Int. Cl.
*H04L 29/06* (2006.01)

(52) U.S. Cl.
USPC .... 380/239; 726/30; 375/240.26; 375/240.28

(58) Field of Classification Search
USPC ................ 380/239, 278, 279; 375/240, 26, 375/240.28
See application file for complete search history.

(56) References Cited

U.S. PATENT DOCUMENTS

| | | | |
|---|---|---|---|
| 6,449,311 B1 * | 9/2002 | Ozcelik et al. | 375/240.16 |
| 6,594,361 B1 * | 7/2003 | Chaney et al. | 380/221 |
| 6,680,976 B1 * | 1/2004 | Chen et al. | 375/240.26 |
| 2002/0168963 A1 * | 11/2002 | Wajs | 455/411 |
| 2004/0247122 A1 * | 12/2004 | Hobrock et al. | 380/241 |
| 2005/0036557 A1 * | 2/2005 | Balakrishnan et al. | 375/240.28 |
| 2005/0147383 A1 * | 7/2005 | Ihara | 386/69 |

OTHER PUBLICATIONS

Chen et al., "Real-Time Video and Audio in the World Wide Web", World Wide Web Journal, Issue One, Published by O'Reilly and Associates (Dec. 11, 1995).*

* cited by examiner

*Primary Examiner* — Taghi Arani
*Assistant Examiner* — Jason Lee (57) ABSTRACT

Essential data elements, particularly entitlement control messages (ECMs), are inserted in a manner that reduces the overhead bit rate without effecting overall tuning time at the customer receiver or security in satellite, cable or other programming networks. ECMs are inserted into the transport stream by detecting random access points (RAPS) in the encoded programming and inserting the ECM packets in a window just ahead of the RAP.

20 Claims, 9 Drawing Sheets

JUST IN TIME DELIVERY OF ENTITLEMENT CONTROL MESSAGES (ECMS) AND OTHER ESSENTIAL DATA ELEMENTS FOR TELEVISION PROGRAMMING

BACKGROUND OF THE INVENTION

1. Field of the Invention

This invention relates to the delivery of television programming and more specifically to the "Just In Time" delivery of essential data elements to facilitate the decryption and decoding of programming at reduced bit rates.

2. Description of the Related Art

Television programs are distributed to viewers by a variety of broadcasting methods including traditional analog broadcast television (National Television Systems Committee or "NTSC" standard), the digital broadcast television "Advanced Television Systems Committee or "ATSC" standard), cable television (both analog and digital), and satellite broadcasting (both analog and digital. These methods allow audio and video streams for television programming to be multiplexed into a transport stream and transmitted over a common transmission medium.

Figure 1:
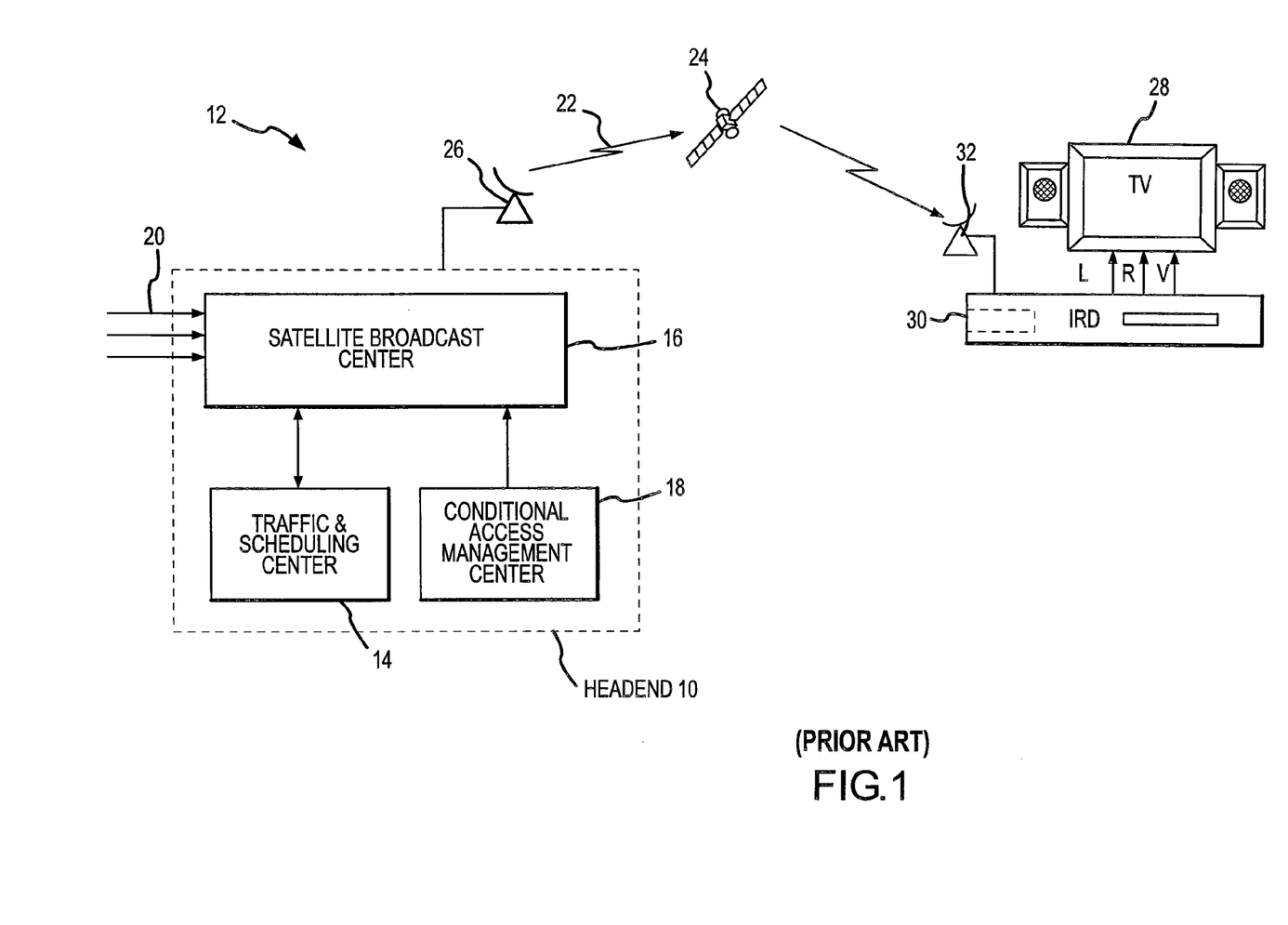
FIG. 1, as described above, is a simplified block diagram of a DirecTV system.

As shown in FIG. 1, the "headend" 10 of a satellite broadcast system 12 includes among other functions a traffic & scheduling center 14, a satellite broadcast center 16 and a conditional access management center (CAMC) 18. The broadcast center encodes, encrypts and multiplexes programming content, either stored or from live feeds 20, into a packetized transport stream 22 that is uplinked to satellites 24 via an antenna 26. The center inserts essential data elements (EDEs) into the transport stream that are required for decryption and proper display by customers. Entitlement Control Message (ECM) packets determine which customers are authorized to decrypt specified programming. A Program Clock Reference (PCR) and Program Time Stamp (PTS) are required for synchronous playback of the video, audio and other streams. A Decoder Time Stamp (DTS) may also be included.

To view a television program on a TV 28, a subscriber may have to subscribe to a service package offered by a pay-TV service/transmission provider such as a direct broadcast satellite (DBS) operator (e.g., DIRECTV) or a cable company. Such a pay-TV service provider may require a subscriber to utilize an integrated receiver decoder (IRD) 30 that enables the descrambling or decryption of the transmission downloaded from an antenna 32. The IRD may be configured to allow the viewing of one or more particular channels, programs, etc. based on a subscriber's payment or subscription. Accordingly, when a subscriber subscribes to a service package, the pay-TV service provider supplies the decryption information to the set-top box via the ECMs in the transport stream to allow the subscriber to view the transmission in the selected package. The IRD locks its internal clock to the encoder clock provided by the PCR. This enables synchronous playback of multiple elements such as video and audio. The IRD uses the PTS contained in the PES packet header to determine what time, relative to the reference clock, to actually play out the element. The DTS (if included) suggests a time when the decoder should initiate decoding.

Figure 2:
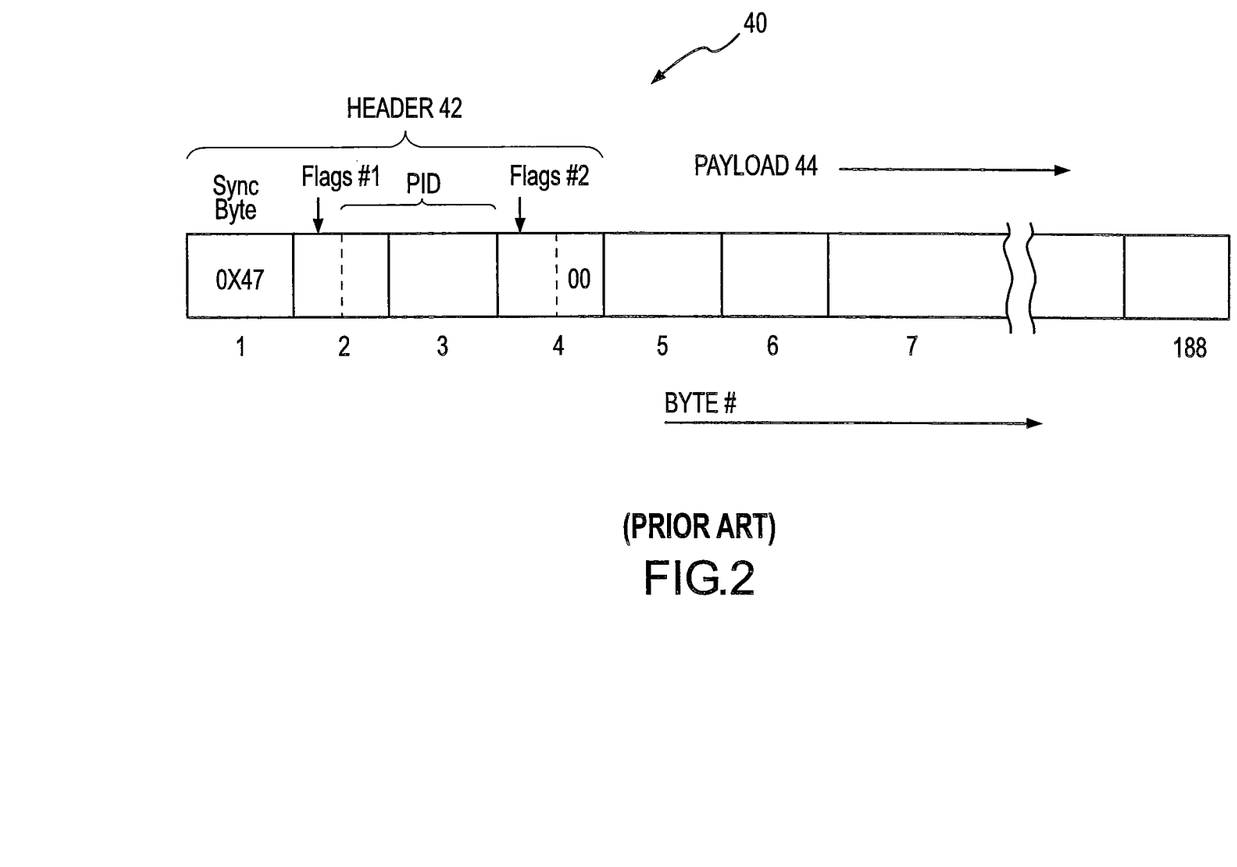
FIG. 2, as described above, is a diagram of an MPEG packet structure.

As shown in FIG. 2, a typical MPEG packet 40 in the transport stream 22 is of a fixed length, 188 bytes for DVB, of which the first 4 bytes contain header information 42 and the remainder is payload 44. The header includes among other things a sync byte "0x47", a payload_unit_start flag, the program ID (PID), an adaptation_field_control flag and two transport_scrambling_control bits, one bit marks the key sense and the other marks whether the packet is encrypted or not. The PID is a number. The program guide defines what (audio, video, ECMs, program guide, program list, etc.) is on a given PID. If the adaptation_field_control flags are set, the packet contains an adaptation field and may contain a PCR for the associated data stream. Traditionally, the PCR appears on the video stream but may appear on both audio and video or on a separate PID. If the payload_unit_start flag is high, the packet contains a PES header, which may contain a PTS (or DTS). For complete description of the packet structure and transport stream see ISO/IEC 13818-1.

Figure 3:
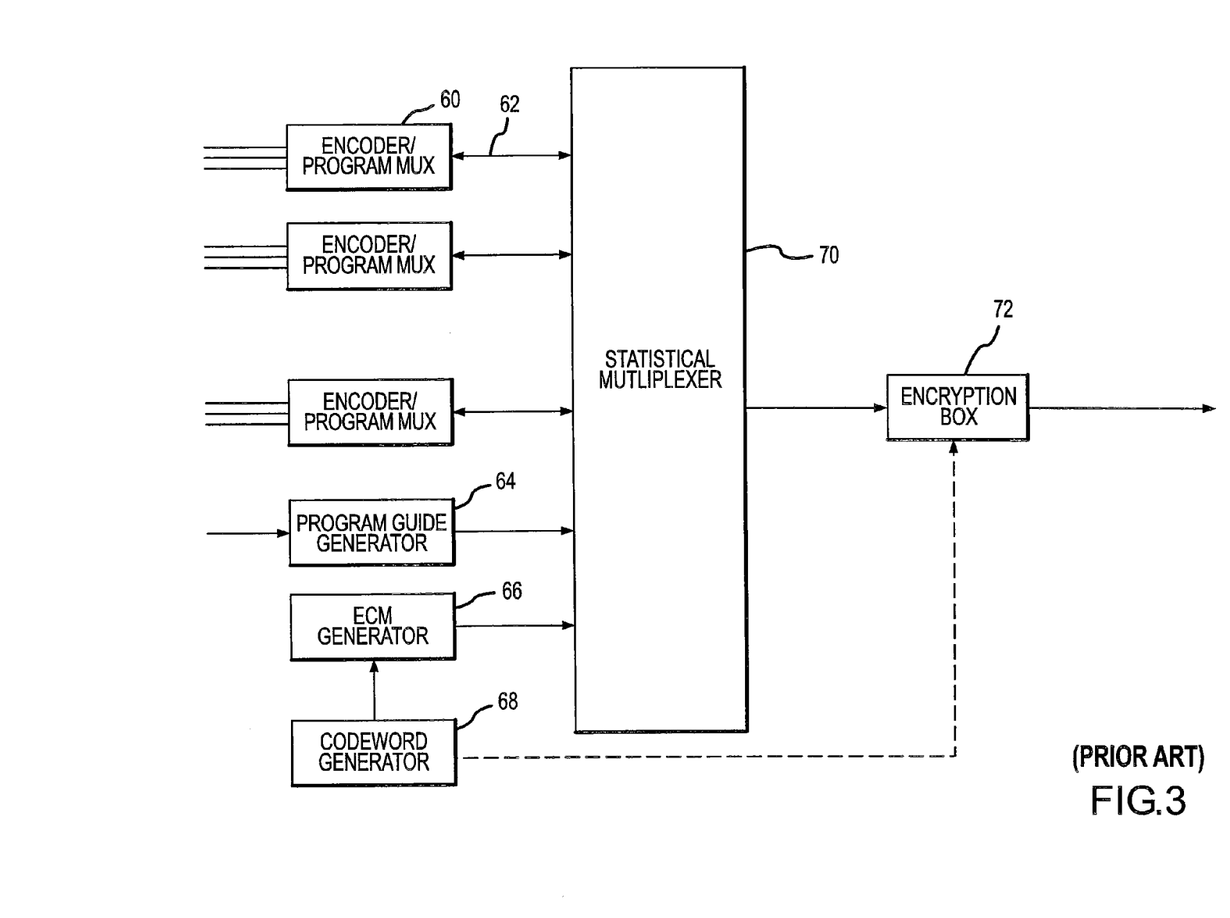
FIG. 3, as described above, is a block diagram of the process for encoding, multiplexing and encrypting programming into a transport stream.

As shown in FIG. 3, to create the transport stream 22, each Encoder/Program Mux 60 encodes a video stream and one or more audio streams for a different program into a packetized program stream 62 assigning each audio and video stream a unique PID. The encoder also inserts a PCR at regular intervals (30× per second) in at least the program stream and a PTS time stamp for every frame (also 30× per second but synced to the frame) in both the video and audio streams (at each packet of) as specified by international ISO/IEC 13818-1. The PCR is traditionally sent with the video stream but may be sent with the audio or assigned its own PID and sent as a separate packet. The PCR and PTS time stamps represent about 4800 bits per second in overhead bits. A Program Guide Generator 64 generates packets that include updated program guide information. A PID list including PIDs for video, audio, and ECM that together make up a program is sent as part of the program guide.

An ECM generator 66 generates an ECM packet with its own PID that includes a "secret message" that an IRD can decode to derive the embedded encryption key needed to decrypt the associated audio/video or data streams. The encryption key is typically updated every 8 seconds by a codeword generator 68 and transmitted at more frequent regular intervals, say 10× a second, by the generator to allow the IRD to start decoding when a customer changes channels. Typical ECM packets represent about 16 kilobits per sec in overhead bits.

A Statistical Mux 70 multiplexes the program streams together with the program guide and ECM packets into the transport stream 22. The Mux may also control the bit allocation between the program encoders to maintain constant quality of the video across programs. The Mux may also vary the split, e.g. 80/20, between video and fixed rate streams (audio, program guide, ECM). The Mux also inserts NULL packets as placeholders for time-insensitive data transmission (program guide, various data, etc.) and as fillers when there isn't enough encoded data to fill the transport stream. The Mux adjusts the pool of NULL packets to keep the output NULL packet rate very near zero. An encryption box 72 encrypts the "payload" in each packet in accordance with the crypto codeword appropriate to the associated ECM. DES and AES are standard encryption methods. The fully multiplexed encrypted transport stream has a rate of 10-20 Megabits per second.

In current MPEG-2 based systems, the amount of overhead associated with essential data elements consumes only a small portion of the available bit rate. However, as the newly adopted ISO/IEC 14496-10 compression standard referred to synonymously as JVT, AVC, H.264 or MPEG-4 Part 10 is integrated into delivery systems the amount of overhead consumed by the EDEs on a percentage basis will increase. In general JVT offers substantially greater compression than MPEG-2 and in simple scenes such as a "talking head" allows bit rates as lows as about 1 kilobit per second (or one packet per second). Clearly, at these low rates, the overhead associated with transmitting the EDEs, particularly the ECMs, becomes very high.

The problem is exacerbated by the increasing complexity, and thus length, of the ECMs. This is especially true for satellite broadcasters who broadcast to, for example, the entire United States and need a sophisticated ECM to transmit specific "black out" information. Although this enhances the capabilities of the system, it also may increase the ECM length several fold. ECM length also continues to increase as the sophistication of pirates' increases.

One solution is to simply reduce the frequency at which the ECM, PCR and PTS are regularly inserted into the stream to maintain a desired percentage overhead. Unfortunately since the delivery of the EDEs is needed to enable a customer's IRD to decode and display the programming, this approach would lead to unacceptably long delays when channel surfing. Another obvious solution is to reduce the complexity of the ECM message, but this makes the "pirates" job much easier. One solution impacts customer satisfaction, the other impacts revenue.

SUMMARY OF THE INVENTION

The present invention provides for insertion of essential data elements, particularly ECMs, into the transport stream in a manner that reduces the overhead bit rate without effecting overall tuning time at the customer receiver or security in satellite, cable or other programming networks.

This is accomplished by scheduling the insertion of the EDEs so that they are received "Just In Time" to authorize and then display the associated program. More specifically, the insertion of the EDEs is keyed off of the occurrence of "random access points" (RAPS) in the program stream at which the receiver can actually start decoding. Typical video encoders such as MPEG-2 and JVT achieve high compression by the removal of temporal redundancy, such that the decoding of one frame depends on previous and future frames. To permit "channel surfing", the encoder constructs RAPs where a receiver can tune into the stream. The RAPs are detected and the ECM packets are inserted into the transport stream just ahead of the RAP. The PCR and PTS are suitably only inserted at RAP by the encoder instead of every frame or 30×/sec as is normally done. This approach eliminates the insertion and transmission of a large percentage of EDEs, which in turn reduces bit rate, without effecting tuning time in any instance. In fact, by pairing the EDEs with the RAP, the tuning time on average will actually be reduced.

In one embodiment, the ECM packets are inserted by replacing null or non-critical packets within a window ahead of the RAP. The minimum insertion time is set by the ECM decoding time of the receiver, i.e. the time needed for the receiver to receive and decode the crypto key before the RAP arrives. The maximum insertion time represents a tradeoff between having a high likelihood of a NULL or non-critical packet within the window and a low likelihood of a consumer channel surfing between the ECM packet and RAP. In a second embodiment, the ECM packets are inserted between packets in the window and the following packets are time-shifted until a NULL packet is encountered and removed.

In another embodiment, if a number of RAPS occur in closely proximity to one another, the ECM generator waits at least one ECM decoding time before inserting another ECM.

In yet another embodiment, in addition to the ECM packets that are sent Just In Time, the ECM Generator may insert ECM packets in a "Look Ahead" mode. Transmitting ECM packets far ahead of time allows the receiver to schedule decoding of the decryption key to better manage the load on the microprocessor. The Look Ahead packets are only useful where the customer has been and continues to view the same program to handle change crypto keys.

In still another embodiment, depending upon the compression technique employed RAPs occur quite often and regularly in the encoded audio stream. However, if the audio is paired with a video signal and they have the same decryption key, then no audio ECM packet need be sent. If they have a different key, the audio ECM packet can be inserted with or at same time as the video ECM key since there is little advantage to decode audio before video.

These and other features and advantages of the invention will be apparent to those skilled in the art from the following detailed description of preferred embodiments, taken together with the accompanying drawings, in which:

DETAILED DESCRIPTION OF THE INVENTION

The present invention provides for insertion of essential data elements, particularly ECMs, into the transport stream in a manner that reduces the overhead bit rate without effecting overall tuning time at the customer receiver or security in satellite, cable or other programming networks. The EDEs are inserted so that they are received by the customer IRD "Just In Time" to authorize and then display the associated program. More specifically, the insertion of the EDEs is keyed off of the occurrence of "random access points" (RAPS) in the program stream at which the IRD can actually start decoding.

Figure 4:
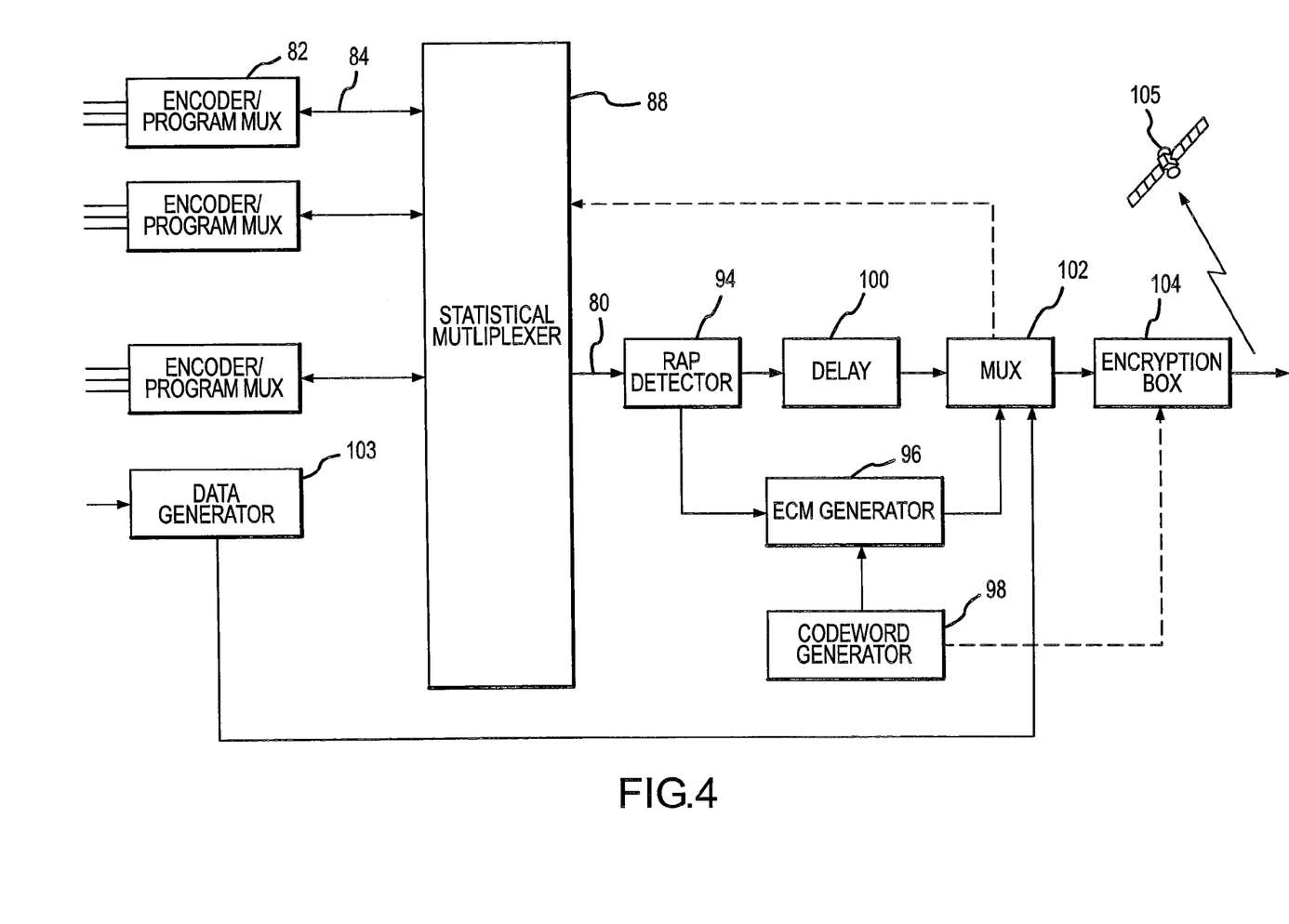
FIG. 4 is a block diagram of a system in accordance with the present invention for inserting the ECM, PCR and PTS into the transport stream "Just In Time" relative to random access points in the encoded programming.
Figure 5:
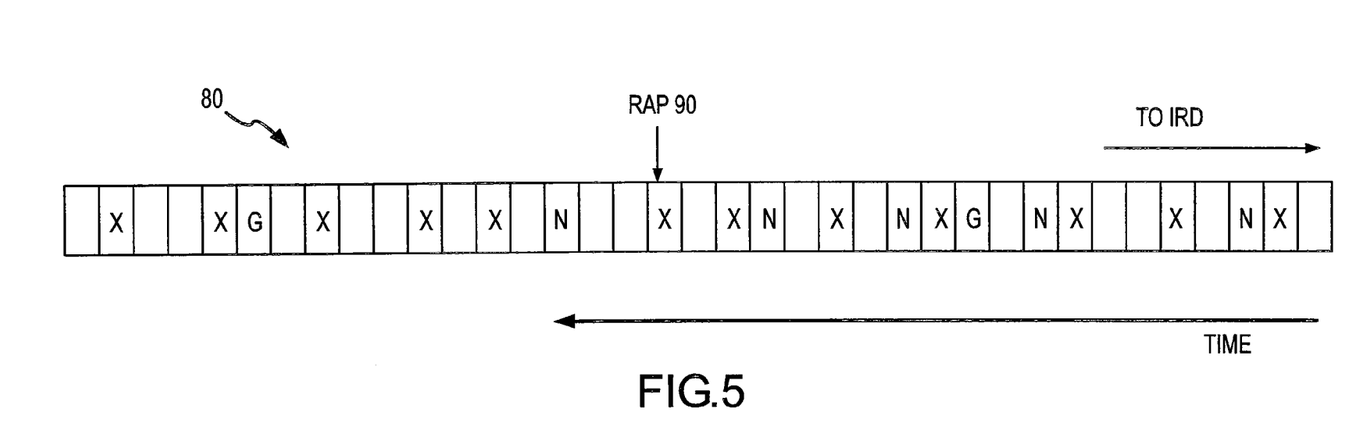
FIG. 5 is a diagram of a transport stream coming out of the Mux prior to insertion of the EOMs.

As shown in FIG. 4, to create a transport stream 80 in which at least the ECMs and preferably the PCR and PTS are delivered "Just In Time" to the customer IRD, each Encoder/Program Mux 82 encodes a video stream and one or more audio streams for a different program into a packetized program stream 84 (Packets X,Y,Z) assigning each audio and video stream a unique PID. A statistical Mux 88 multiplexes the program streams X,Y,Z and into transport stream 80 as shown in FIG. 5. The Mux also inserts NULL Packets "N", which serve as fillers when there is insufficient encoded data to fill the transport stream and as placeholders for time-insensitive data transmission (program guide, various data, etc.).

The encoder 82 e.g., MPEG-2 or JVT achieves compression by the removal of temporal redundancy. To a great extent, one frame of video is very similar to the next and pictures are coded with previous and future portions of the video acting as a reference. To permit tuning into a program, RAPs 90 are coded into the program stream whereby an IRD can tune into the stream. These are locations where there are no coding references to a past frame. An intelligent encoder places the RAPS at scene changes since they are naturally occurring and can be done without a coding penalty. Realizing that a channel surfer does not wish to wait until a scene change to start watching a program, and that there will be significant coding inefficiency, an intelligent encoder schedules additional RAPs based on other criteria including length of time since the last RAP, length of time until the next scene change, the difficulty of video and overall complexity of all other services in the statistical multiplex pool. For compression efficiency, these RAPs are relatively infrequent, occurring typically every second or two.

The encoder inserts a PCR in at least the program stream and a PTS in both the video and audio streams. In a preferred embodiment, the encoder only inserts the PCR and the PTS at the RAP 90. It is simply not necessary to send the PCR with every frame and the PTS 30×/sec. The PCR may be included in the video RAP packet or have its own PID. The video PTS may also be included in the video RAP packet. In the case of MPEG-2, for example, the RAP is a transport packet that contains the start of an "I frame". The PCR and PTS are suitably inserted in that transport packet. The packet header includes a flag that indicates an I frame and flags that indicate the presence of the PCR and PTS. In the case of JVT, it may be difficult to find a RAP in the transport stream. A instantaneous decoder refresh (IDR) is an obvious point. Since the encoder knows where a RAP point is . . . the current convention is that the encoder shall mark RAP points in an adaptation field using the random_access_indicator bit. In JVT a RAP can also be a point whereby if you start decoding at that point, one will have a decodable frame in N number of frame. N is carried as a message within the transport stream. The PCR and PTS are suitably inserted in transport packet containing the RAP.

Just In Time insertion of the PCR and PTS reduces the overhead bits required to transmit the PCR and PTS. Sending the PCRs, typically 8 bytes, at the RAP instead of every 30 ms saves perhaps 576 bits per second per program. Assuming dropping 29 PES headers per second, sending the PTS, typically 19 bytes, at the RAP saves 4,408 bits per second. Now, as compared to the savings that will be realized by sending the ECM packets "Just In Time", these amounts are pretty small, less than 1% and typically about 0.1% of an MPEG-2 stream. These amounts do become higher with JVC and possibly significant in certain situations such as talking heads. However, the system could be implemented as before to insert the PCR and PTS at regular intervals. Just In Time transmission of the PCR and PTS reduces overhead without increasing overall tuning time. In fact by pairing the PCR and PTS with the RAP, the chance that a customer could channel surf to a point in the stream between the PCR/PTS and the RAP, and thus have to wait for the next RAP before initiating decoding is eliminated.

A RAP detector 94 detects RAPs 90 in the transport stream 80. Detector implementation depends on the nature of the data. For MPEG-2, the detector looks for a sequence header that indicates the presence of an I frame. For JVT, the detector looks for an adaptation field with the random_access_indicator bit set. Detection of a RAP triggers an ECM Generator 96 to generate an ECM Packet "E" based on the current encryption key provided by a codeword generator 98. A delay line 100 delays the transport stream so that a Mux 102 can insert the ECM Packet into the stream 80 just ahead of the RAP by replacing a NULL packet N or non-critical packet G.

A Data Generator 103 generates "G" packets that include time insensitive information such as updated program guide information, a PID list, subscription information, software downloads, data enhanced video, program description information, etc. The "G" packets may be multiplexed into the transport stream by the statistical Mux 88 as in normal convention. However, this reduces the likelihood that a NULL or non-critical packet will fall within the window. The Mux 102 adjusts the pool of NULL packets generated by statistical Mux 88 to keep the output NULL packet rate out of Mux 102 very near zero. An encryption box 104 encrypts the "payload" in each packet in accordance with the crypto codeword appropriate to the associated ECM. The fully multiplexed encrypted transport stream 80 has a rate of 10-20 Megabits per second for broadcast via antenna, cable or satellite 105.

Figure 6:
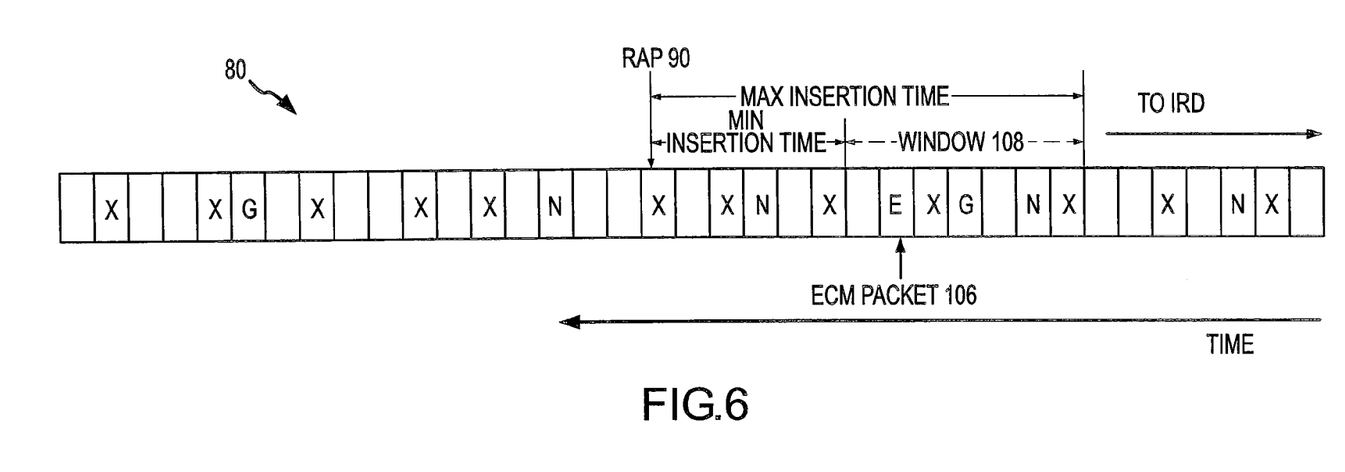
FIG. 6 is a diagram of the transport stream illustrating insertion of an ECM via NULL packet replacement.

As shown in FIG. 6, an ECM packet 106 is delivered "Just In Time" provided that it is inserted anywhere within a window 108 just ahead of the RAP 90. The minimum insertion time is set by the minimum ECM decoding time of the receiver, i.e. the time needed for the receiver to receive and decode the crypto key in ECM Packet 196 before RAP 90 arrives. This is typically in the hundreds of milliseconds. The maximum insertion time represents a tradeoff between having a high likelihood of a NULL or non-critical packet within the window and a low likelihood of a consumer channel surfing between the ECM packet 106 and RAP 90. This is typically a second or two.

To increase the likelihood of a NULL packet occurring in window 108, the Statistical Multiplexer 88 can simply increase the pool of NULL packets. Furthermore, because the non-critical data packets are withheld from the statistical multiplexer 88 and inserted by Mux 102 the number of NULL packets that pass through the RAP detector is increased. The ECM Packets are given priority over all other non-critical packets, which are multiplexed into the stream by Mux 102 as NULL packets are available.

The multiplexer 102 can insert the ECM packet 106 into the stream in window 108 a number of different ways. One approach is to start looking at the packets at the max insertion time and simply replace the first NULL or non-critical packet that is encountered in the window. Another approach is to look at all of the packets in the window and replace the NULL or non-critical packet that is closest to the RAP.

Figure 7:
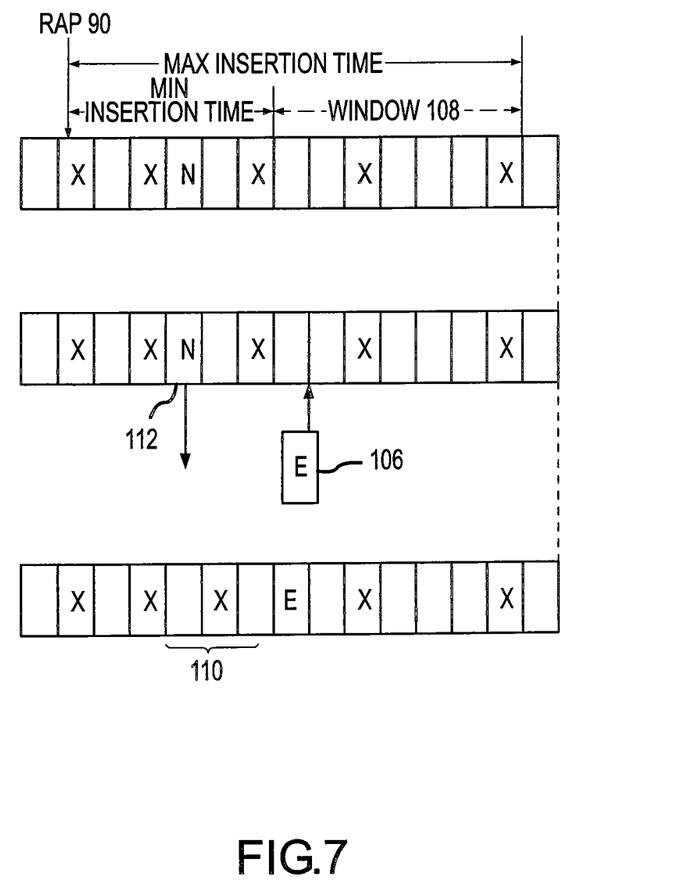
FIG. 7 is a diagram of the transport stream illustrating insertion of an ECM via time shifting.

If no suitable packet exists within the window, then either the stream can be transmitted without the required ECM Packet for initiating decoding at that one RAP or the ECM Packet 106 can be inserted in the window using a time-shifting procedure as shown in FIG. 7. The ECM Packet 106 is inserted between packets in the window thereby time shifting a number of packets 110 until a NULL or non-critical packet 112 is encountered and removed from the stream. The drawback to this approach is that the PCR and PTS for shifted packets must be corrected. When this case occurs, Mux 102 may send a message back to the statistical multiplexer to increase the number of NULL packets to reduce the likelihood that time-shifting will be required. Note, time shifting can be used to insert all of the ECM packets but is generally not preferred.

Figure 8:
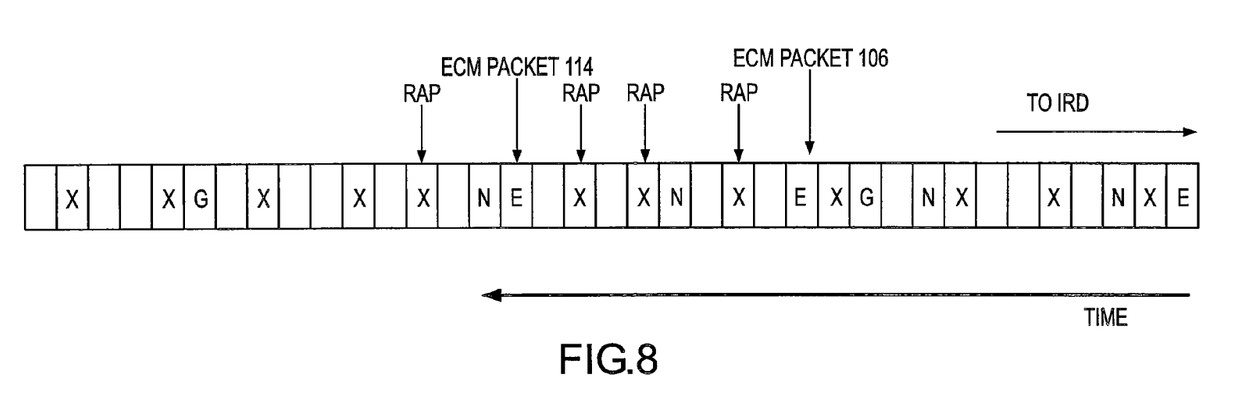
FIG. 8 is a diagram of the transport stream illustrating insertion of ECM packets with closely spaced RAPs.

If, as shown in FIG. 8, the transport stream includes a number of closely spaced RAPs, the Mux 102 waits at least one "ECM decoding" time (min insertion time) before inserting another ECM packet 114. Sending multiple ECMs is wasteful since the decoder requires at least one "ECM decoding" time to produce the code word.

Figure 9:
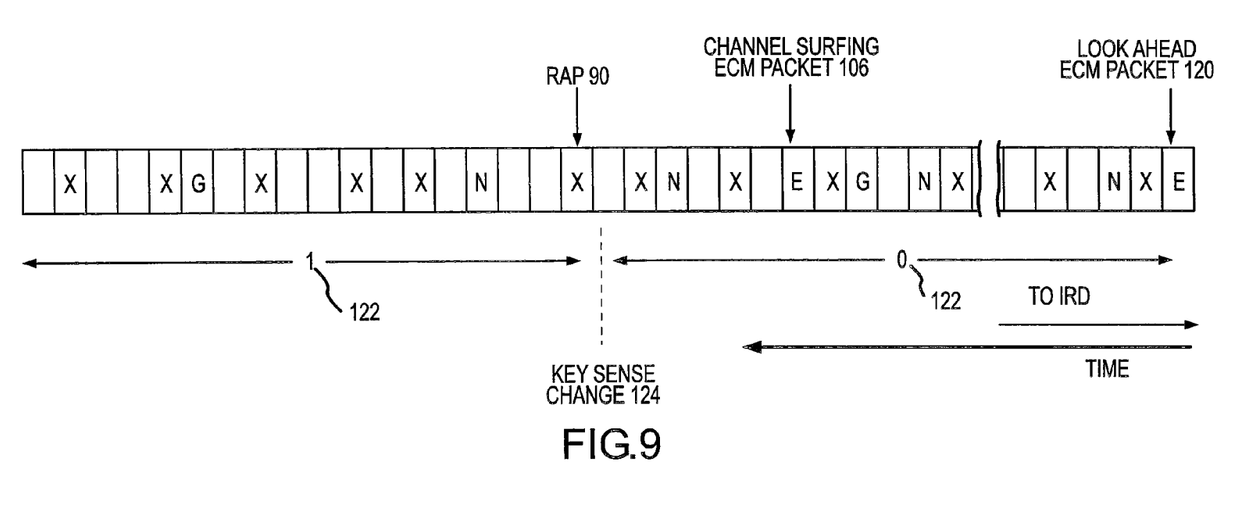
FIG. 9 is a diagram of the transport stream illustrating both "channel surfing" and "look ahead" ECM packets.

In addition to sending ECM Packets 106 just ahead of the RAPs in what is referred to as the "channel surfing" mode, ECM Packets 120 may be inserted outside the window far ahead of the RAP, e.g. typically >2 seconds, in what is referred to as "look ahead" mode. Transmitting ECM packets far ahead of a change in the key sense flag 122 allows the receiver to schedule decoding the ECM for the decryption key to better manage the load on the microprocessor. The Look Ahead packets are only useful where the customer has been and continues to view the same program to handle change crypto keys.

More specifically, when the ECM Generator 96 receives a new encryption key from the codeword generator 98, the ECM generator constructs the look ahead ECM Packet 120 and the Mux 102 inserts it into the transport stream, preferably by replacing a NULL Packet. A field in the packet indicates that it is a look ahead packet for the next key sense change 124. The ECM Generator waits about 4-12 seconds, selects the next RAP 90 and makes the change in the encryption key and key sense flag. The updates to the encryption key and key sense flag are incorporated into the channel surfing ECM packets 106 as they are generated and inserted in the window just ahead of the RAPs. Note, for any RAPs that are detected during the waiting period, ECM packets are still inserted in the window just ahead of the RAP using the old encryption key.

Figure 10:
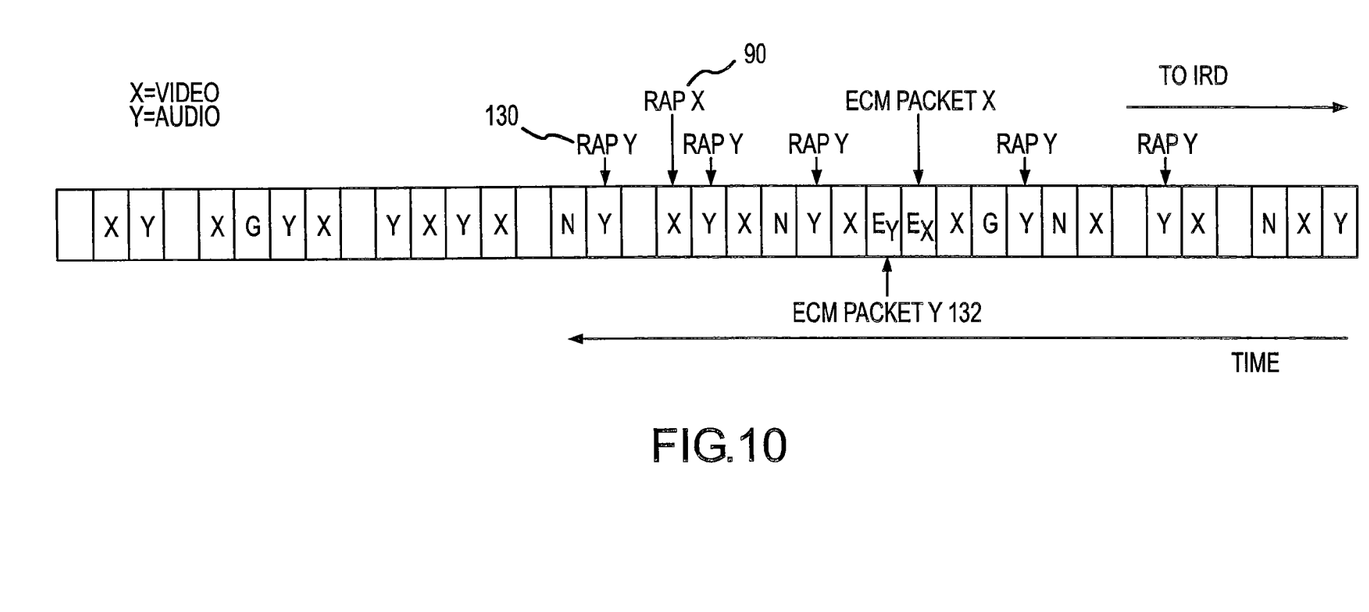
FIG. 10 is a diagram of the transport stream illustrating insertion of audio ECM packets keyed off of the video ECM packets.

As shown in FIG. 10, depending upon the compression technique employed RAPs 130 occur quite often and regularly in the encoded audio stream. If the audio is paired with a video signal and they have the same decryption key, then no audio ECM packet need be sent. If they have different keys, the audio ECM packet 132 can be inserted with or at same time as the video ECM packet 134, which is inserted in the window just ahead of the video RAP X, since there is little advantage to decode audio before video.

Figure 11A:
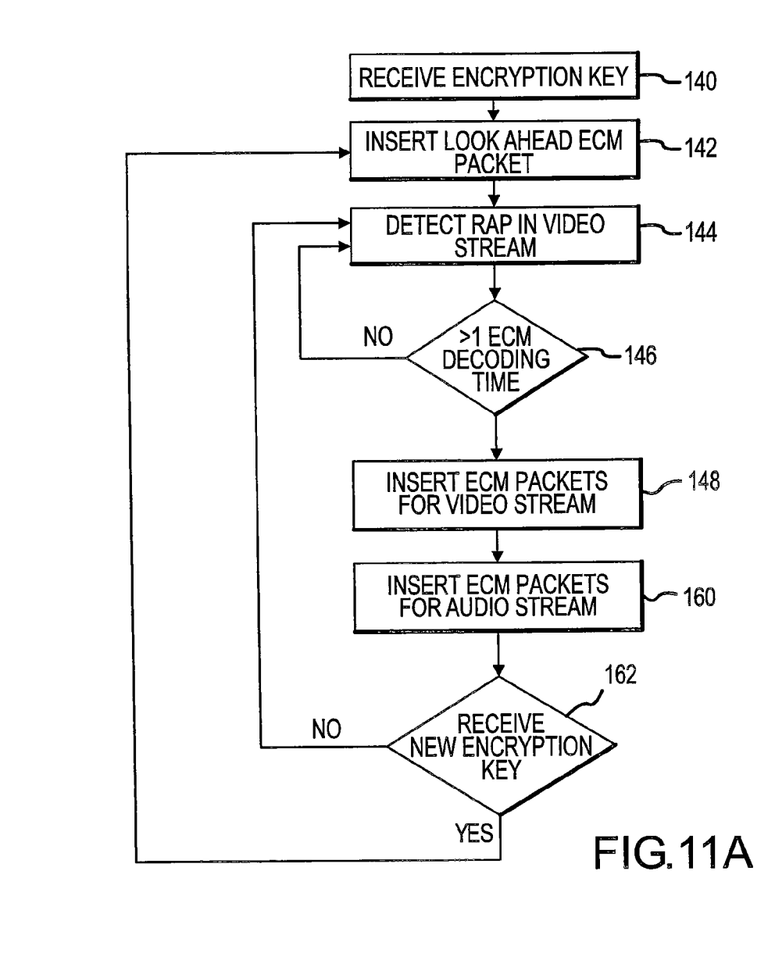
FIGS. 11a and 11b are flowcharts of an exemplary procedure for inserting ECM packets.
Figure 11B:
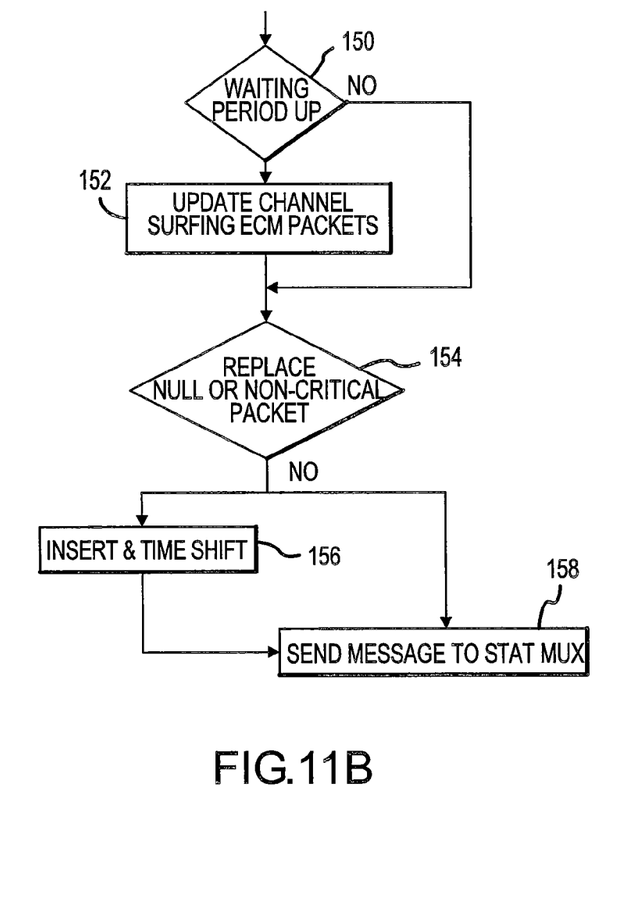

The varying techniques for inserting ECM packets in the transport stream can be combined and integrated in various embodiments. An exemplary approach is illustrated in FIGS. 11a and 11b. When the ECM Generator receives an encryption key (step 140), it inserts a look ahead ECM Packet (step 142). When the next RAP is detected in the video stream (step 144), the generator determines whether at least one ECM decoding time has passed since the last ECM Packet (of the same key sense) was inserted (step 146). If yes, the generator provides an ECM packet to the Mux for insertion in the video stream (step 148). As shown in FIG. 11b, the ECM packet is inserted by first determining whether the waiting period from the last look ahead ECM packet is up (step 150). If yes, the channel surfing ECM packets are updated (step 152). Then the Mux tries to insert the channel surfing ECM packet into the window by replacing a NULL or non-critical packet (step 154). If the Mux fails, it can either insert the packet between other packets in the window and time shift the succeeding packets until it identifies a NULL or non-critical packet to remove (step 156) and send a message to the statistical multiplexer to increase the NULL pool (step 158) or just skip the RAP and send the message. In this embodiment, the generator also inserts an ECM packet for the audio stream in the window just ahead of the RAP in the video stream (step 160). Once the ECM packets are inserted, the generator determines whether a new encryption key has been received (step 162). If not, the process continues to look for the next RAP in the video stream (step 144). If yes, the process inserts a look ahead ECM packet for the new key (step 142) and continues.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

What is claimed is:

1. A method of generating a transport stream, comprising:
    encoding at least one program into a video stream;
    coding a plurality of random access points (RAPs) into the video stream at which a decoder can begin decoding each program;
    upon detecting a RAP in the plurality of RAPs in the video stream, triggering an ECM generator to generate an entitlement control message (ECM) based on a current encryption key, wherein the ECM enables the decoder to derive the current encryption key; and
    delaying the video stream to insert the ECM into the video stream just ahead of the detected RAP, the pairing of the ECM with the given RAP enabling the decoder to derive the current encryption key needed to decrypt and decode the associated video stream at the RAP.

2. The method of claim 1, further comprising inserting a presentation time stamp (PTS) with the RAP.

3. The method of claim 1, wherein the ECM is inserted into a window just ahead of the RAP, the window being bounded by a minimum ECM decoding time and a maximum insertion time.

4. The method of claim 3, wherein the transport stream contains a plurality of closely spaced RAPs, wherein the plurality of closely spaced RAPs are spaced apart by at least the minimum ECM decoding time.

5. The method of claim 1, wherein the ECMs are ECM packets that are inserted into the transport stream by replacing a NULL packet with the ECM packet.

6. The method of claim 5, wherein the NULL packet closest to the RAP is replaced with the ECM.

7. The method of claim 1, wherein the ECMs are ECM packets that are inserted into the stream between packets and the packets that follow are time-shifted until a NULL or non-critical packet can be removed.

8. The method of claim 1, wherein the ECMs inserted in a window just ahead of a RAP are channel surfing ECMs, further comprising:
    receiving a new encryption key;
    inserting a look ahead ECM in the transport stream with the new encryption key;
    waiting for a period of time longer than the window;
    updating the channel surfing ECMs with the new encryption key; and
    repeating as new encryption keys are received.

9. The method of claim 1, wherein the at least one program is encoded by removing temporal redundancy from the associated video stream.

10. An apparatus, comprising:
    an encoder that encodes a program into a video stream including random access points (RAPs) at which a decoder may begin decoding the video stream;
    an entitlement control message (ECM) generator that upon the detection of an occurrence of a RAP in the video stream triggers generation of an ECM based on a current encryption key, the ECM including a message that allows the decoder to derive the current encryption key; and a multiplexer that inserts the ECM into the video stream within a window just ahead of the detected RAP, the pairing of the ECM with the RAP allowing the decoder to derive the current encryption key from the ECM to begin decoding the video stream at the RAP.

11. The apparatus of claim 10, wherein the encoder inserts a presentation time stamp (PTS) in the video stream with the RAP.

12. The apparatus of claim 10, wherein the ECM is inserted within the window just ahead of the RAP.

13. The apparatus of claim 12, wherein the window is bounded by a minimum ECM decoding time and a maximum insertion time.

14. The apparatus of claim 10, wherein the video stream contains a plurality of closely spaced RAPs and the multiplexer waits at least a minimum ECM decoding time to insert another ECM.

15. The apparatus of claim 10, wherein the multiplexer inserts the ECM into the video stream by replacing a NULL packet with the ECM.

16. The apparatus of claim 15, wherein the multiplexer replaces the NULL packet that is closest to the RAP.

17. The apparatus of claim 10, wherein ECMs are ECM packets the multiplexer inserts between packets in the window and time-shifts the packets that follow until a NULL or non-critical packet can be removed.

18. The apparatus of claim 10, wherein the ECMs inserted in the window ahead of a RAP are channel surfing ECMs, wherein when the ECM generator receives a new encryption key, it generates a look ahead ECM with the new encryption key that the multiplexer inserts into the stream, the ECM generator waits for a period of time longer than the window and then updates the channel surfing ECM with the new encryption key.

19. A method, comprising:
   encoding a plurality of programs into respective program streams, each program stream including random access points (RAPs) where a decoder may begin decoding the program;
   multiplexing the program streams to create a transport stream;
   upon detecting a RAP, triggering the generation of an entitlement control message (ECM) based on a current encryption key, the ECM including a message allowing the decoder to derive the current encryption key;
   delaying the transport stream to insert the ECM into the transport stream within a time window ahead of the detected RAP, the pairing of the ECM with the RAP allowing the decoder to derive the current encryption key from the ECM to begin decoding the compressed program stream at the RAP; and
   broadcasting the transport stream.

20. The method of claim 19, wherein the time window is bounded by a minimum ECM decoding time and a maximum insertion time.

* * * * *